United States Patent
Wu et al.

(10) Patent No.: US 11,852,357 B2
(45) Date of Patent: Dec. 26, 2023

(54) METHOD FOR CONTROLLING AIR CONDITIONER, AIR CONDITIONER

(71) Applicant: Gree Electric Appliances, Inc. of Zhuhai, Guangdong (CN)

(72) Inventors: Shaobo Wu, Guangdong (CN); Bin Yi, Guangdong (CN); Jingwen Gao, Guangdong (CN); Jutao Jia, Guangdong (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 332 days.

(21) Appl. No.: 17/286,595

(22) PCT Filed: Aug. 6, 2019

(86) PCT No.: PCT/CN2019/099379
§ 371 (c)(1),
(2) Date: Apr. 19, 2021

(87) PCT Pub. No.: WO2020/078076
PCT Pub. Date: Apr. 23, 2020

(65) Prior Publication Data
US 2021/0389011 A1 Dec. 16, 2021

(30) Foreign Application Priority Data
Oct. 18, 2018 (CN) .......................... 201811217243.5

(51) Int. Cl.
*F24F 11/64* (2018.01)
*F24F 11/526* (2018.01)
(Continued)

(52) U.S. Cl.
CPC ............ *F24F 11/64* (2018.01); *F24F 11/526* (2018.01); *G05B 13/027* (2013.01); *G06F 40/279* (2020.01); *G06V 30/422* (2022.01)

(58) Field of Classification Search
CPC .......... F24F 11/64; F24F 11/526; F24F 11/00; F24F 11/89; F24F 2110/00; G05B 13/027;
(Continued)

(56) References Cited

U.S. PATENT DOCUMENTS

2010/0257129 A1* 10/2010 Lyon ...................... G06F 16/683
707/723
2010/0288468 A1* 11/2010 Patel ....................... F24F 11/46
165/59

(Continued)

FOREIGN PATENT DOCUMENTS

| CN | 103175286 A | 6/2013 |
| CN | 204438431 U | 7/2015 |

(Continued)

OTHER PUBLICATIONS

International Search Report, dated Oct. 29, 2019, in International application No. PCT/CN2019/099379, filed on Aug. 6, 2019.
(Continued)

*Primary Examiner* — Christopher E. Everett
*Assistant Examiner* — Tameem D Siddiquee
(74) *Attorney, Agent, or Firm* — McAndrews, Held & Malloy, Ltd.

(57) ABSTRACT

Disclosed in the present disclosure are a method and system for controlling an air conditioner, the air conditioner, and a household appliance. The method comprises: data collected by a control device during an operation of the air conditioner is received, wherein the data comprises question information, and at least one of indoor image data and an operation status diagram of the air conditioner located indoors; the collected data is input to a training model to obtain an answer that corresponds to the question information; and the answer is played.

7 Claims, 3 Drawing Sheets

(51) Int. Cl.
  *G05B 13/02* (2006.01)
  *G06K 9/00* (2022.01)
  *G06F 40/279* (2020.01)
  *G06V 30/422* (2022.01)
(58) Field of Classification Search
  CPC ............ G05B 15/02; G05B 2219/2614; G06F 40/279; G06F 40/284; G06F 40/30; G06V 30/422
  See application file for complete search history.

(56) References Cited

U.S. PATENT DOCUMENTS

| | | | |
|---|---|---|---|
| 2014/0006660 A1* | 1/2014 | Frei | H04L 43/10 710/104 |
| 2014/0067133 A1* | 3/2014 | Liu | F24F 11/49 700/276 |
| 2019/0197154 A1* | 6/2019 | Cohen | G06F 16/583 |
| 2019/0236446 A1* | 8/2019 | Qin | G06N 3/044 |
| 2019/0353378 A1* | 11/2019 | Ramamurti | G05B 15/02 |

FOREIGN PATENT DOCUMENTS

| | | |
|---|---|---|
| CN | 105066357 A | 11/2015 |
| CN | 105095919 A | 11/2015 |
| CN | 205351642 U | 6/2016 |
| CN | 106452990 A | 2/2017 |
| CN | 106951473 A | 7/2017 |
| CN | 107360157 A | 11/2017 |
| CN | 108036469 A | 5/2018 |
| CN | 108088043 A | 5/2018 |
| CN | 207350702 U | 5/2018 |
| CN | 109028478 A | 12/2018 |
| JP | 2008249327 A | 10/2008 |
| KR | 20180110976 A | 10/2018 |

OTHER PUBLICATIONS

Chinese search report, dated Aug. 26, 2020 in Chinese application No. 2018112172435 (3 pages).

* cited by examiner

METHOD FOR CONTROLLING AIR CONDITIONER, AIR CONDITIONER

CROSS-REFERENCE TO RELATED APPLICATIONS

The disclosure is a 371 application of International Patent Application No. PCT/CN2019/099379, filed Aug. 6, 2019, which claims priority to Chinese Patent Application No. 201811217243.5, filed on Oct. 18, 2018 and entitled "Method and system for controlling air conditioner, air conditioner, and household appliance", the disclosures of which are hereby incorporated by reference in their entireties.

TECHNICAL FIELD

The present disclosure relates to the field of intelligent control of appliances, in particular to a method and system for controlling an air conditioner, the air conditioner, and a household appliance.

BACKGROUND

With increasingly greater influence of smart home on the life of people, it is increasingly convenient for users to operate household appliances, but some special operators, such as people with visual defects, still have some problems in controlling the smart home.

For example, before the air conditioner is started, the user needs to check the indoor closeness, people with normal vision can know opening and closing conditions of windows only by scanning, but people with visual impairment have to check the closeness of the windows one by one before the windows; and for another example, in an operation process of the air conditioner, some prompt information is only displayed on a display screen of the air conditioner and cannot be broadcasted in voice, and people with visual impairment cannot know the prompt information in the operation process of the air conditioner. In the related art, people with visual impairment cannot use the same air conditioner like people with normal vision conveniently and rapidly.

No effective solution has been proposed yet at present to solve the problems.

SUMMARY

According to one aspect of the embodiments of the present disclosure, provided is a method for controlling an air conditioner. The method includes: data collected by a control device during an operation of the air conditioner is received, wherein the data includes question information, and at least one of indoor image data and an operation status diagram of the air conditioner located indoors; the collected data is input to a training model to obtain an answer that corresponds to the question information; and the answer is played.

Optionally, before the collected data is input to the training model to obtain an answer that corresponds to the question information, the method further includes: a training data set is obtained, wherein the training data set includes at least one of an operation status diagram of the air conditioner, a collected opening and closing status diagram of indoor doors and windows and question and answer information; and the training model is generated on the basis of the training data set.

Optionally, the training model is generated on the basis of the training data set includes: the training data set is pre-processed to obtain a pre-processing result, and the pre-processing result is processed to obtain the training model, the steps including: image features of the operation status diagram and/or the opening and closing status diagram is extracted by using a convolutional neural network, the question and answer information are converted into a word vector list by using a word vector technology, and question features are extracted from the word vector list; element dot product processing is performed on the image features and the question features; classification operation is performed on a result after element dot product processing to obtain an answer prediction value; and the image features, the question features and the answer prediction value associated with the image features and the question features are stored to generate the training model.

Optionally, the question and answer information includes: at least one question and an answer corresponding to the question is marked on the operation status diagram and/or the opening and closing status diagram of the air conditioner.

Optionally, before the data is received collected by a control device, the method further includes: a shooting device is used by the control device for shooting to obtain indoor image data, or the uploaded indoor image data shot by other apparatuses is received; and the indoor image data is controlled to be updated.

Optionally, after the answer is played, the method further includes: an answer evaluation result fed back is received by the control device; and the training data set is periodically adjusted on the basis of the answer evaluation result.

Optionally, the collected data is input to the training model to obtain an answer that corresponds to the question information includes: any one or more data of the acquired indoor image data, the operation status diagram of the air conditioner located indoors and the question information with the training data are matched; and under the condition of successful matching, a corresponding answer in the training data is read.

Optionally, before the answer is played, the method further includes: the answer is converted into voice information by the control device; and the voice information is played by the control device and adjustment information input by a target object on the basis of the voice information is received, wherein the adjustment information is configured to adjust an operation status of the air conditioner.

According to another aspect of the embodiments of the present disclosure, further provided is another method for controlling an air conditioner. The method includes: receiving, by the air conditioner, data collected by a control device during an operation of the air conditioner, wherein the data includes question information, and at least one of indoor image data and an operation status diagram of the air conditioner located indoors; the collected data is input by the air conditioner to a training model to obtain an answer that corresponds to the question information; and the answer is played by the air conditioner.

According to another of the embodiments of the present disclosure, further provided is a system for controlling an air conditioner, including: a control device, configured to collect data, wherein the data includes question information, and at least one of indoor image data and an operation status graph of the air conditioner located indoors; and an air conditioner, in communication with the control device, and configured to input the received data to a training model during an operation and return an answer, obtained by training, corresponding to the question information to the control device.

According to yet another of the embodiments of the present disclosure, further provided is an air conditioner, including: a reception device, configured to receive data collected by a control device during an operation of the air conditioner, wherein the data includes question information, and at least one of indoor image data and an operation status diagram of the air conditioner located indoors; a processor, configured to input the collected data to a training model to obtain an answer that corresponds to the question information; and a sending device, configured to return the answer to the control device.

According to yet another aspect of the embodiments of the present disclosure, further provided is a household appliance, including: a reception device, configured to receive data collected by a control device during an operation of a household appliance, wherein the data includes question information, and at least one of indoor image data and an operation status diagram of the air conditioner located indoors; a processor, configured to input the collected data to a training model to obtain an answer that corresponds to the question information; and a sending device, configured to return the answer to the control device.

According to yet another aspect of the embodiments of the present disclosure, further provided is a storage medium, the storage medium including a stored program, wherein when the program is operated, an apparatus where the storage medium is located is controlled to execute the method for controlling the air conditioner.

According to yet another aspect of the embodiments of the present disclosure, further provided is a processor, the processor being configured to run a program, wherein the method for controlling an air conditioner is executed when the program is run.

BRIEF DESCRIPTION OF THE DRAWINGS

The accompanying drawings described herein serve to provide a further understanding of the present disclosure and form a part hereof, and the illustrative embodiments of the present disclosure and the description of the illustrative embodiments serve to explain the present disclosure and are not to be construed as unduly limiting the present disclosure. In the drawings.

DETAILED DESCRIPTION OF THE EMBODIMENTS

In order to make those skilled in the art better understand the solution of the present disclosure, the technical solutions of embodiments of the present disclosure will be described below clearly and comprehensively below in conjunction with accompanying drawings of the embodiments of the present disclosure. Apparently, the embodiments described are merely some of rather than all of the embodiments of the present disclosure. Based on the embodiments of the present disclosure, all other embodiments obtained by those of ordinary skill in the art without making creative efforts should fall within the scope of protection of the present disclosure.

It should be noted that the terms "first", "second" and so forth, in the description and claims of the present disclosure and in the above-mentioned drawings, are used to distinguish between similar objects and not necessarily to describe a particular order or sequential order. It should be understood that the data used in this way is interchanged where appropriate, such that the embodiments of the disclosure described herein are implemented in other sequences than those illustrated or described herein. In addition, terms "comprising", "having", and any variations thereof are intended to cover non-exclusive inclusions, for example, processes, methods, systems, products, or equipment that contains a series of steps or units need not be limited to those explicitly listed steps or units, but may include other steps or units not explicitly listed or inherent to these processes, methods, products, or devices.

According to embodiments of the present disclosure, provided is a method embodiments for controlling an air conditioner, it is noted that steps illustrated in the flowcharts of the accompanying drawings may be executable in a computer system such as a set of computer-executable instructions, and although a logical order is illustrated in the flowcharts, under some conditions, the steps shown or described may be executed in an order different from that herein.

Figure 1:
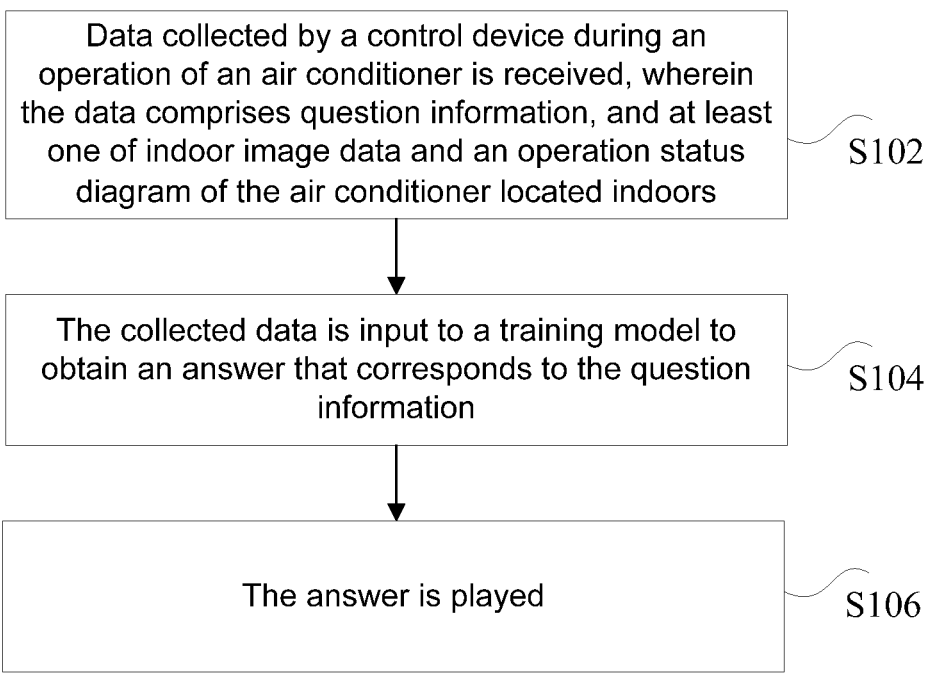
FIG. 1 is a flowchart of a method for controlling an air conditioner according to embodiments of the present disclosure.

FIG. 1 is a flowchart of a method for controlling an air conditioner according to the embodiments of the present disclosure, and as shown in FIG. 1, the method includes the following steps:

S102, data collected by a control device during an operation of an air conditioner is received, wherein the data comprises question information, and at least one of indoor image data and an operation status diagram of the air conditioner located indoors.

In some optional embodiments of the present disclosure, the indoor image data includes but is not limited to the opening and closing status diagram of indoor doors and windows, the operation status diagram of the air conditioner is a status diagram of an air conditioner wind shield, and temperature, wind speed, humidity and other prompt information diagrams displayed on a display screen during operation of the air conditioner, and the question information is a voice question generated when the user controls the air conditioner by means of voice.

S104, the collected data is input to a training model to obtain an answer that corresponds to the question information.

In some optional embodiments of the present disclosure, before the S104, the method further includes: a training data set is obtained, wherein the training data set includes at least one of an operation status diagram of the air conditioner, a collected opening and closing status diagram of indoor doors and windows and question and answer information; and the training model is generated on the basis of the training data set.

According some optional embodiments of the present disclosure, a machine learning model is generated by means of training of following sample data: an air conditioner status diagram, wherein the conditioner status diagram is a status diagram of an air conditioner wind shield, and temperature, wind speed, humidity and other prompt information diagrams displayed on a display screen during operation of the air conditioner; an opening and closing status diagram of doors and windows; and some commonly-used voice instructions when a user controls the air conditioner by means of voice, and answers to the voice instructions.

Figure 2:
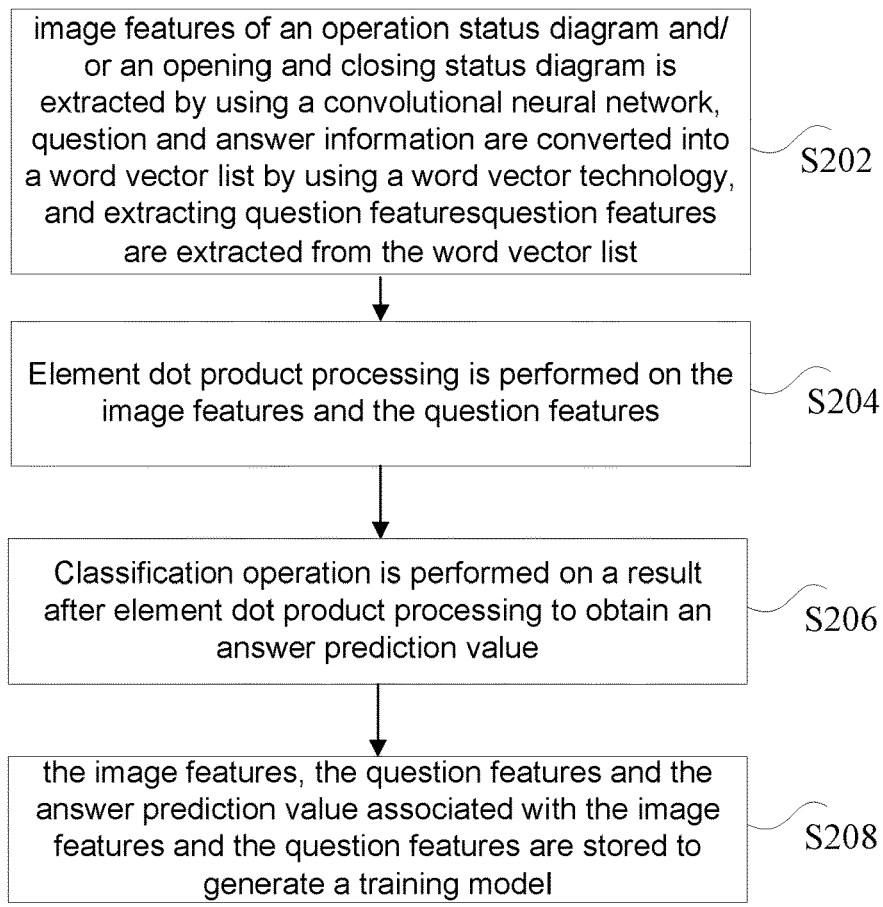
FIG. 2 is a flowchart of a method for training data to obtain a training model according to the embodiments of the present disclosure.

In some optional embodiments of the present disclosure, the training model is generated on the basis of the training data set includes: the training data set is pre-processed to obtain a pre-processing result, and the pre-processing result is processed to obtain the training model, FIG. 2 is a flowchart of a method for training data to obtain the training model according to the embodiments of the present disclosure, and as shown in FIG. 2, the method includes the following steps:

S202, image features of an operation status diagram and/or an opening and closing status diagram are extracted by using a convolutional neural network, converting question and answer information into a word vector list by using a word vector technology, and question features are extracted from the word vector list.

In some optional embodiments of the present disclosure, the question and answer information of the S202 includes: at least one question and an answer corresponding to the question are marked on the operation status diagram and/or the opening and closing status diagram of the air conditioner.

A sample picture needs to be pre-processed before extracting image features of the sample picture, a plurality of questions and answers to the questions are marked for each picture, for example, a question "is the window opened" is marked on a picture with an opened window, and correspondingly, an answer "the window is in an opened state currently" is marked on the picture; questions "how much the temperature of the air conditioner is currently" and "what level the intensity of the air speed is currently" are marked on one air conditioner display status diagram, and related contents displayed on a display of the air conditioner in the picture serve as answers to the questions and are marked on the picture; and a question "which direction the air conditioner sweeps currently" is marked on one status diagram of the air conditioner wind shield, and the direction of the air conditioner wind shield in the picture serves an answer to the question and is marked on the picture.

The image features of the sample picture are extracted by using the convolutional neural network, and in machine learning, the convolutional neural network is a deep feed-forward neural network and is applied to image recognition. The marked question and answer information is converted into the word vector list by using the word vector technology, and the features of the questions are extracted from the word vector list. A word vector, a general name of a set of language modeling and feature learning techniques in natural language processing, maps words or phrases from a vocabulary to vectors of real numbers.

S204, element dot product processing is performed on the image features and the question features.

S206, classification operation is performed on a result after element dot product processing to obtain an answer prediction value.

S208, the image features, the question features and the answer prediction value associated with the image features and the question features are stored to generate a training model.

Click operation and classification operation are performed on the image features and the question features extracted in the S202 to obtain a predicted answer of the question, and the image features, the question features and the answer associated with the image features and the question features are stored in a corresponding relation to obtain a trained model. when the newly collected image and question information are input into the trained model for prediction, the answer to the question may be obtained according to the stored corresponding relation.

In some optional embodiments of the present disclosure, before the data is received collected by a control device, the method further includes: a shooting device is used by the control device for shooting to obtain indoor image data, or the uploaded indoor image data shot by other apparatuses is received; and the indoor image data is controlled to be updated.

According to some optional embodiments of the present disclosure, when people with visual impairment use the air conditioner indoors, the control device is firstly used for collecting indoor photos, for example, a plurality of photos including pictures of doors and windows and pictures of the display screen of the air conditioner are collected all around indoors, the photos are uploaded to the air conditioner, then questions are put forward for the pictures, the air conditioner inputs the received pictures and question information into a trained machine learning model for prediction, and answers corresponding to the questions are obtained.

An image collection device is integrated on the control device, the control device is connected to the air conditioner in a wireless communication mode, and the wireless communication mode includes but is not limited to a 4G network, wifi, Bluetooth, etc. The control device may also collect indoor images regularly, send the collected latest image information to the air conditioner and update pictures stored in the air conditioner in real time, for example, under the condition that people with visual impairment want to adjust the temperature of the air conditioner after the air conditioner is started for a period of time, people may inquire "how much the indoor temperature is currently", and after the air conditioner receives the information of the question, the current indoor temperature may be identified according to the latest air conditioner operation status diagram.

The control device controls regular inquiry of whether a collected latest indoor image needs to be updated, it can be guaranteed that the image stored on the air conditioner is indoor image data continuously kept in the latest status by means of regular inquiry, and an accuracy of answers, obtained after the image data are identified by means of the training model, corresponding to question information may be determined.

In some optional embodiments of the present disclosure, the S104 is achieved by means of the following method: matching any one or more data of the acquired indoor image data, the operation status diagram of the air conditioner located indoors and the question information with the training data; and under the condition of successful matching, a corresponding answer in the training data is read.

According to some optional embodiments of the present disclosure, after the indoor picture is received, the operation status diagram of the air conditioner and the question information sent by the control device, the air conditioner matches one or more of the above data and pre-stored sample data used for training the machine learning model and reads mark answers corresponding to the pictures in the training sample if matching succeeds.

S106, the answer is played.

In some optional embodiments of the present disclosure, before the S106 is performed, the method further includes: the answer is converted into voice information by the control device; and the voice information is played by the control device and adjustment information input by a target object on the basis of the voice information is received, wherein the adjustment information is configured to adjust an operation status of the air conditioner.

For example, people with visual impairment put forward a question "is the window opened" for a shot picture, and the air conditioner obtains an answer "the window is in an open state currently" after prediction by means of the machine learning model. The answer is converted into the voice information to be sent to the control device for voice playing, and people with visual impairment can close the window after hearing the voice broadcast. For another example, people with visual impairment put forward a question "how much the indoor temperature is currently" for the shot picture, the air conditioner identifies a current indoor temperature value displayed on the current operation status diagram of the air conditioner after prediction by means of the machine learning model according to the operation status diagram of the air conditioner and the question information, and converts the temperature value into the voice information to be sent to control device for voice playing, in some embodiments, people with visual impairment may correspondingly adjust the temperature of the air conditioner by means of a voice control instruction according to the current indoor temperature after hearing the voice broadcast, the voice control instruction is sent to the air conditioner by means of the control device, the air conditioner receives the voice control instruction of the user, and corresponding adjustment is automatically conducted on the air conditioner.

In some optional embodiments of the present disclosure, after the answer is played, the method further includes: an answer evaluation result fed back is received by the control device; and the training data set is periodically adjusted on the basis of the answer evaluation result. In some embodiments, the user evaluates the air conditioner identification result and input the evaluation result by means of voice, the evaluation result is uploaded to the air conditioner by means of the control device, and the air conditioner regularly updates the training data set used for training the machine learning model by means of feedback of the user so as to improve an identification accuracy of the machine learning model.

Compared with the prior art, the solution of the present disclosure uses a sample set to train the machine learning model by collecting the indoor image data, the operation status diagram of the indoor air conditioner and the corresponding question and answer information to form the training sample set. When people with visual impairment use the air conditioner, only the indoor image and the operation status diagram of the air conditioner need to be collected by means of the control device and people with visual impairment need to proposes a question associated with air conditioner operation, after the air conditioner receives indoor image information, the operation status diagram of the air conditioner and the question information proposed by people with visual impairment, the above data are input into the trained neural network model for prediction, an answer to the question proposed by people with visual impairment is obtained, the answer is converted into the voice information to be sent to the control device for voice broadcast, and after receiving the voice broadcast information, people with visual impairment correspondingly control the air conditioner.

By means of the steps, the technical effect that people with visual impairment and people with normal vision may conveniently and rapidly use the same air conditioner in the same environment is achieved, the technology is applied to the field of smart home, more convenient services are provided for people with visual impairment, and the user experience is improved.

Figure 3:
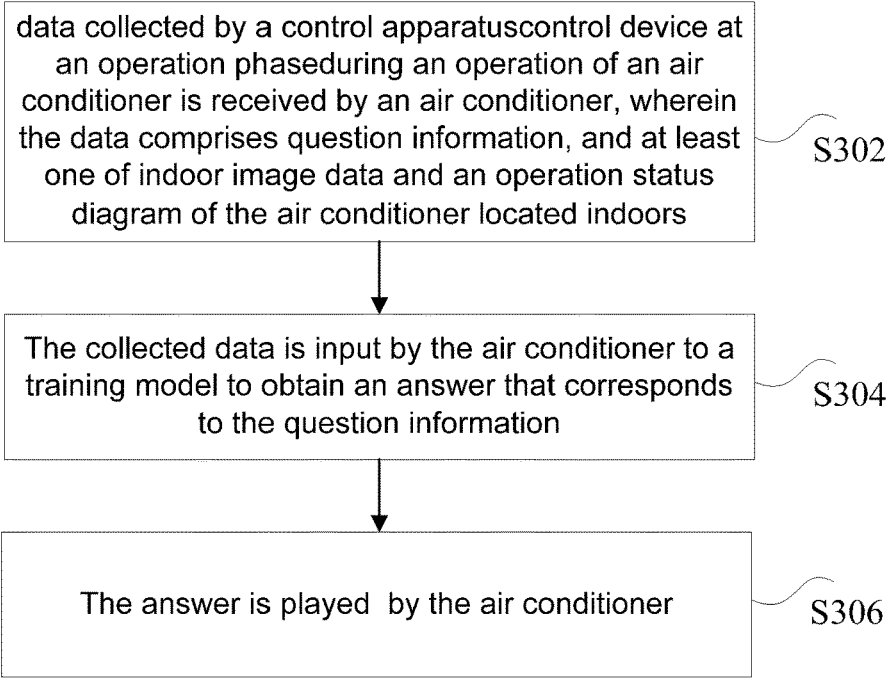
FIG. 3 is a flowchart of another method for controlling an air conditioner according to the embodiments of the present disclosure.

FIG. 3 is a flowchart of another method for controlling an air conditioner according to the embodiments of the present disclosure, and as shown in FIG. 3, the method includes the following steps:

S302, data collected by a control device during an operation of the air conditioner is received, by the air conditioner, wherein the data comprises question information, and at least one of indoor image data and an operation status diagram of the air conditioner located indoors;

S304, the collected data is input by the air conditioner to a training model to obtain an answer that corresponds to the question information; and S306, the answer is played by the air conditioner.

S302 to S306 provide another method for controlling an air conditioner, it should be noted that the preferred implementation modes of the embodiments in S302 to S304 are described with reference to the embodiments shown in FIGS. 1-2, and will not be described in detail herein.

According to some optional embodiments of the present disclosure, the air conditioner inputs the collected data to the training model to obtain an answer corresponding to the question information, then the answer is converted into the voice information locally in the air conditioner, and the voice information is played locally in the air conditioner.

Figure 4:
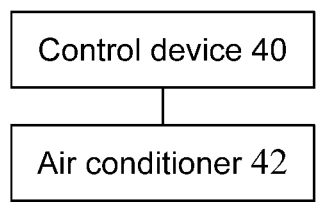
FIG. 4 is a structural diagram of a system for controlling an air conditioner according to the embodiments of the present disclosure.

FIG. 4 is a structural diagram of a system for controlling the air conditioner according to the embodiments of the present disclosure, and as shown in FIG. 4, the system includes:

a control device 40, configured to collect data, wherein the data comprises question information, and at least one of indoor image data and an operation status graph of the air conditioner located indoors; and an air conditioner 42, in communication with the control device, and configured to input the received data to a training model during an operation and return an answer, obtained by training, corresponding to the question information to the control device.

It should be noted that the preferred implementation modes of the embodiments in FIG. 3 may be described with reference to the embodiments shown in FIGS. 1-2, and will not be described in detail herein.

Figure 5:
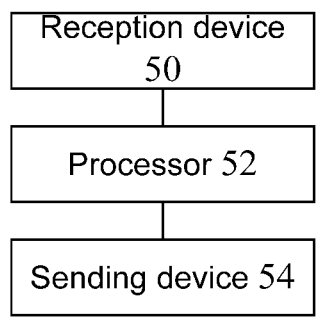
FIG. 5 is a structural diagram of an air conditioner according to the embodiments of the present disclosure.

FIG. 5 is a structural diagram of an air conditioner according to the embodiments of the present disclosure, and as shown in FIG. 5, the air conditioner includes:

a reception device 50, configured to receive data collected by a control device during an operation of the air conditioner, wherein the data comprises question information, and at least one of indoor image data and an operation status diagram of the air conditioner located indoors;

a processor 52, configured to input the collected data to a training model to obtain an answer that corresponds to the question information; and a sending device 54, configured to return the answer to the control device.

It should be noted that the preferred implementation modes of the embodiments in FIG. 5 are described with reference to the embodiments shown in FIGS. 1-2, and will not be described in detail herein.

Figure 6:
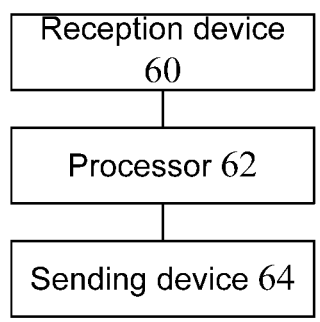
FIG. 6 is a structural diagram of an household appliance according to the embodiments of the present disclosure.

FIG. 6 is a structural diagram of a household appliance according to the embodiments of the present disclosure, and as shown in FIG. 6, the household appliance includes:

a reception device 60, configured to receive data collected by a control device during an operation of a household appliance, wherein the data comprises question information, and at least one of indoor image data and an operation status diagram of the air conditioner located indoors;

a processor 62, configured to input the collected data to a training model to obtain an answer that corresponds to the question information; and a sending device 64, configured to return the answer to the control device.

It should be noted that the preferred implementation modes of the embodiments in FIG. 6 are described with reference to the embodiments shown in FIGS. 1-2, and will not be described in detail herein.

The embodiments of the present disclosure further provide a storage medium, the storage medium including a stored program, wherein when the program is operated, an apparatus where the storage medium is located is controlled to execute the method for controlling the air conditioner.

The storage medium described above is configured to store the program that executes the following functions: receiving, by the air conditioner, data collected by a control device during an operation of the air conditioner, wherein the data includes question information, and at least one of indoor image data and an operation status diagram of the air conditioner located indoors; the collected data is input by the air conditioner to a training model to obtain an answer that corresponds to the question information; and returning, by the air conditioner, the answer to the control device for playing, or receiving, by the air conditioner, data collected by a control device during an operation of the air conditioner, wherein the data includes question information, and at least one of indoor image data and an operation status diagram of the air conditioner located indoors; the collected data is input by the air conditioner to a training model to obtain an answer that corresponds to the question information; and the answer is played by the air conditioner.

The embodiments of the present disclosure further provide is a processor, the processor being configured to run a program, wherein the method for controlling an air conditioner is executed when the program is run.

The process described above is configured to execute the program that achieves the following functions: receiving, by the air conditioner, data collected by a control device during an operation of the air conditioner, wherein the data includes question information, and at least one of indoor image data and an operation status diagram of the air conditioner located indoors; the collected data is input by the air conditioner to a training model to obtain an answer that corresponds to the question information; and returning, by the air conditioner, the answer to the control device for playing. or receiving, by the air conditioner, data collected by a control device during an operation of the air conditioner, wherein the data includes question information, and at least one of indoor image data and an operation status diagram of the air conditioner located indoors; the collected data is input by the air conditioner to a training model to obtain an answer that corresponds to the question information; and the answer is played by the air conditioner.

The serial number of the embodiments of the present disclosure is only used for description and does not represent the good and bad of the embodiment.

In the above embodiments of the present disclosure, the descriptions of various embodiments are emphasized on their respective aspects, and for portions of a certain embodiments that are not described in detail, reference is made to the associated descriptions of other embodiments.

In several embodiments provided in the present disclosure, it should be understood that the disclosed technology is implemented in other ways. The apparatus embodiments described above are merely illustrative, for example, a division of the units is a division of logical functions, and in practice there are additional ways of division, for example, a plurality of units or assemblies are combined or integrated into another system, or some features are ignored or not executed. As another point, shown or discussed coupling or direct coupling or communication connection between each other is an indirect coupling or communication connection by means of some interface, unit or module, and may be in an electrical or other form.

In some embodiments, the units illustrated as separate components are physically separate or not, and the components shown as units are physical units or not, that is, may be located in one place, or may also be distributed over a plurality of units. Part or all of the units may be selected according to actual needs to achieve the objective of the solution of the embodiment.

In addition, each functional unit in some embodiments of the present disclosure are be integrated in one processing unit, or each unit exists separately and physically, or two or more units are integrated in one unit. The above integrated units are implemented in a hardware form or implemented in a form of software functional unit.

In some embodiment, the integrated unit is stored in a computer readable storage medium if implemented in the form of a software functional unit and sold or used as an independent product. Based on the understanding, the technical solution of the present disclosure is embodied in the form of a software product in essence or a part contributing to the prior art or all or part of the technical solution, and the computer software product is stored in a storage medium and comprises a plurality of instructions for making a computer device (which is a personal computer, a server or a network device, etc.) execute all or part of the steps of the methods described in the various embodiments of the present disclosure. The foregoing storage medium includes: a USB flash disk, a read-only memory (ROM), a random access memory (RAM), a mobile hard disk, a magnetic disk, an optical disk and other media capable of storing program codes.

The foregoing is merely preferred embodiments of the present disclosure, and it should be noted that several improvements and modifications are made by those of ordinary skill in the art without departing from the principles of the present disclosure, which should also be considered as the scope of protection of the present disclosure.

INDUSTRIAL APPLICABILITY

The solution provided by the embodiments of the present disclosure is applied to a control process of an air conditioner, and by using the solution provided by the embodiments of the present disclosure, people with visual impairment and people with normal vision may conveniently and rapidly use the same air conditioner in the same environment, thereby solving the technical problem that people with visual impairment cannot use the same air conditioner like people with normal vision conveniently and rapidly.

What is claimed is:

1. A method for controlling an air conditioner, comprising:
receiving, by a reception device, data collected by a control device during an operation of an air conditioner, wherein the data comprises question information, and at least one of indoor image data and an operation status diagram of the air conditioner located indoors, the question information comprises: questions put forward by operators is collected during the operation of the air conditioner, and the question information is proposed when a user controls the air conditioner according to a voice control instruction;
inputting, by a processor, the collected data to a training model to obtain an answer that corresponds to the question information; and
playing, by a control device, the answer;
wherein before the inputting the collected data to the training model to obtain the answer that corresponds to the question information, the method further comprises: obtaining a training data set, wherein the training data set comprises at least one of the operation status diagram of the air conditioner, a collected opening and closing status diagram of indoor doors and windows and question and answer information; and generating the training model on the basis of the training data set;
wherein the generating the training model on the basis of the training data set comprises: pre-processing the training data set to obtain a pre-processing result, and processing the pre-processing result to obtain the training model, which comprise: extracting image features of the operation status diagram and/or the opening and closing status diagram by using a convolutional neural network, converting the question and answer information into a word vector list by using a word vector technology, and extracting question features from the word vector list; performing element dot product processing on the image features and the question features; performing classification operation on a result after element dot product processing to obtain an answer prediction value; and storing the image features, the question features and the answer prediction value associated with the image features and the question features to generate the training model, wherein before the playing the answer, the method further comprises:
converting the answer into voice information by the control device; and
playing the voice information by the control device and receiving adjustment information input by a target object on the basis of the voice information, wherein the adjustment information is used to adjust an operation status of the air conditioner.

2. The method as claimed in claim 1, wherein the question and answer information comprises: marking at least one question and an answer corresponding to the question on the operation status diagram and/or the opening and closing status diagram of the air conditioner.

3. The method as claimed in claim 1, wherein before the receiving the data collected by the control device, the method further comprises:
using a shooting device by the control device for shooting to obtain the indoor image data, or receiving uploaded indoor image data shot by other apparatuses; and
controlling the indoor image data to be updated.

4. The method as claimed in claim 1, wherein after the playing the answer, the method further comprises:
receiving an answer evaluation result fed back by the control device; and
periodically adjusting the training data set on the basis of the answer evaluation result.

5. The method as claimed in claim 1, wherein the inputting the collected data to the training model to obtain the answer that corresponds to the question information comprises:
matching any one or more data of the collected indoor image data, the operation status diagram of the air conditioner located indoors and the question information with the training data; and
under the condition of successful matching, reading a corresponding answer in the training data.

6. A method for controlling an air conditioner, comprising:
receiving, by the air conditioner, data collected by a control device during an operation of the air conditioner, wherein the data comprises question information, and at least one of indoor image data and an operation status graph of the air conditioner located indoors, the question information comprises: questions put forward by operators is collected during the operation of the air conditioner, and the question information is proposed when a user controls the air conditioner according to a voice control instruction;
inputting, by the air conditioner, the collected data to a training model to obtain an answer that corresponds to the question information; and
playing the answer by the air conditioner;
wherein before the inputting the collected data to the training model to obtain the answer that corresponds to the question information, the method further comprises: obtaining a training data set, wherein the training data set comprises at least one of the operation status graph of the air conditioner, a collected opening and closing status diagram of indoor doors and windows and question and answer information; and generating the training model on the basis of the training data set;
wherein the generating the training model on the basis of the training data set comprises: pre-processing the training data set to obtain a pre-processing result, and processing the pre-processing result to obtain the training model, which comprise: extracting image features of the operation status diagram and/or the opening and closing status diagram by using a convolutional neural network, converting the question and answer information into a word vector list by using a word vector technology, and extracting question features from the word vector list; performing element dot product processing on the image features and the question features; performing classification operation on a result after element dot product processing to obtain an answer prediction value; and storing the image features, the question features and the answer prediction value associated with the image features and the question features to generate the training model, wherein before the playing the answer, the method further comprises:

converting the answer into voice information by the control device; and playing the voice information by the control device and receiving adjustment information input by a target object on the basis of the voice information, wherein the adjustment information is used to adjust an operation status of the air conditioner.

7. An air conditioner, comprising:

a reception device, configured to receive data collected by a control device during an operation of the air conditioner, wherein the data comprises question information, and at least one of indoor image data and an operation status diagram of the air conditioner located indoors, the question information comprises: questions put forward by operators is collected during the operation of the air conditioner, and the question information is proposed when a user controls the air conditioner according to a voice control instruction;

a processor, configured to input the collected data to a training model to obtain an answer that corresponds to the question information; and a sending device, configured to return the answer to the control device;

the processor is configured to obtain a training data set, wherein the training data set comprises at least one of the operation status diagram of the air conditioner, a collected opening and closing status diagram of indoor doors and windows and question and answer information;

pre-process the training data set to obtain a pre-processing result, and process the pre-processing result to obtain the training model, which comprise: extract image features of the operation status diagram and/or the opening and closing status diagram by using a convolutional neural network, convert the question and answer information into a word vector list by using a word vector technology, and extract question features from the word vector list; perform element dot product processing on the image features and the question features; perform classification operation on a result after element dot product processing to obtain an answer prediction value; and store the image features, the question features and the answer prediction value associated with the image features and the question features to generate the training model, convert the answer into voice information by the control device, and play the voice information by the control device and receive adjustment information input by a target object on the basis of the voice information, wherein the adjustment information is used to adjust an operation status of the air conditioner.

* * * * *